Oct. 23, 1928.
J. WASTAK
1,688,407
OAT SPROUTER
Filed Feb. 28, 1927
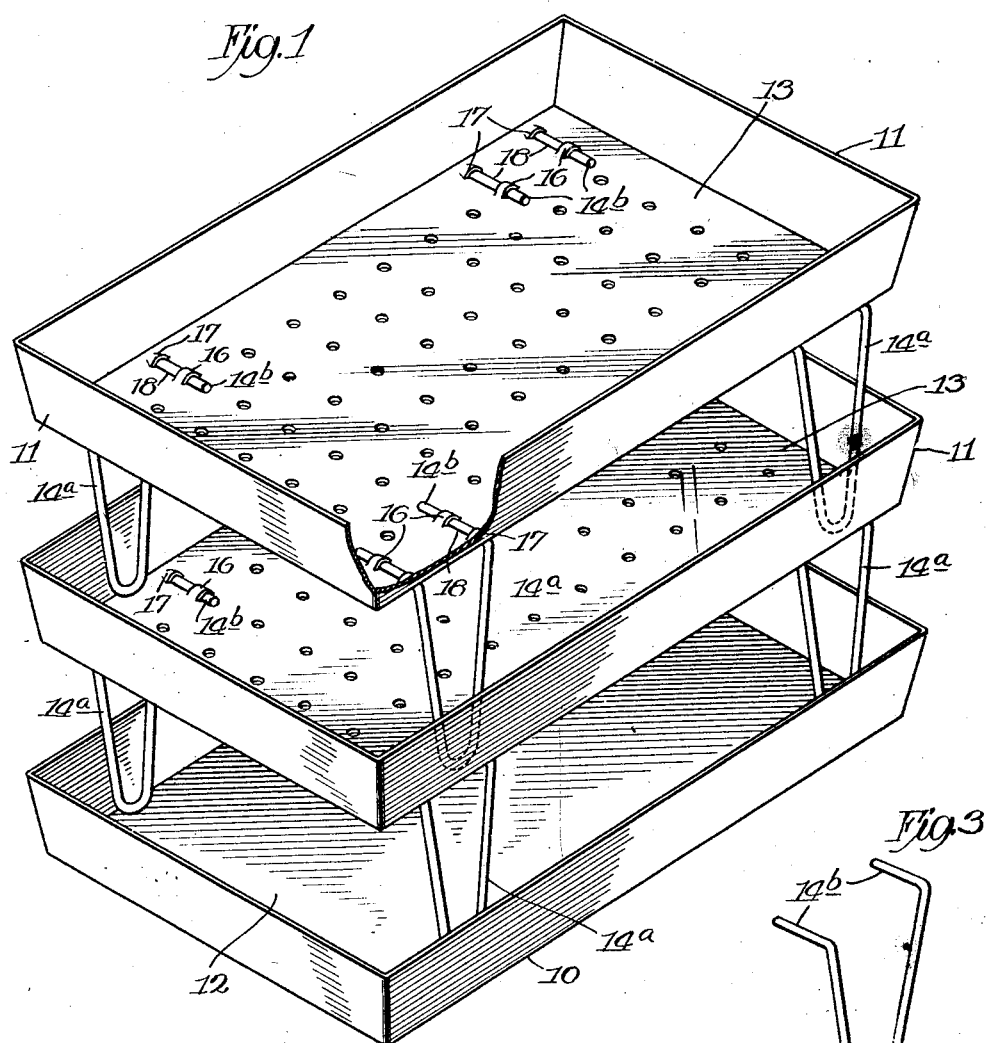
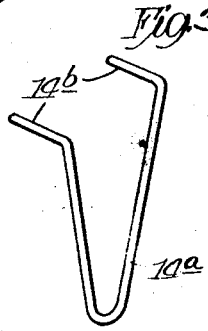
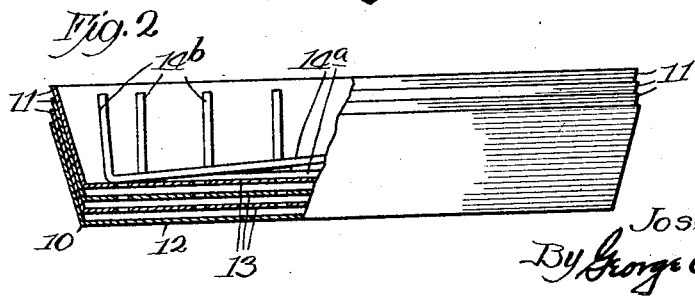
Inventor:
Joseph Wastak
By George E. Mueller Atty.

Patented Oct. 23, 1928.

1,688,407

UNITED STATES PATENT OFFICE.

JOSEPH WASTAK, OF CHICAGO, ILLINOIS.

OAT SPROUTER.

Application filed February 28, 1927. Serial No. 171,389.

My invention relates to an "oat-sprouter" such as may be employed during the winter months to sprout grain for use as poultry food.

One object of my invention is to produce a simplified economical oat sprouter.

Another object is the provision of an oat sprouter which will be strong and serviceable in use, but which may readily be disjointed and packed within a relatively small space for shipping or the like.

Other objects and advantages will appear from a consideration of the following description and the accompanying drawings showing one form which the invention may take, wherein—

Fig. 1 is a view in perspective of my improved oat sprouter.

Fig. 2 is an end elevation partly in section, of a group of nested pans ready for storage or shipment, and Fig. 3 is a detail of one of the legs.

In accomplishing the invention I provide a drip pan adapted to be placed lowermost to receive waste material, water, et cetera, which may drop therein, and a number of sprouter pans adapted to be placed above the drip pan, and above each other, to form a series of tiers. Each sprouter pan has four readily removable legs, one at each corner, secured in such a manner thereto, that they may be supported within the interior and on the bottom of a lower pan. The pans have outflared sides, making them nestable, and the legs are readily removable, without the use of any tools whatever, to permit such nesting.

Referring now to the drawings, the sprouter comprises a drip pan 10 and a plurality of sprouter pans 11. The drip pan, as shown, is a shallow pan with an imperforate bottom 12 and slightly outflaring sides, and is designed solely for the purpose of catching matter falling from the sprouter pans.

Each sprouter pan has a perforated bottom 13, and outflaring imperforate sides, with a leg 14, secured at each corner thereof. The legs comprise a half loop 14$^a$ of heavy gauge wire, adapted to form a foot, with two right angular end portions 14$^b$ adapted to connect the leg to the corner of the pan. To facilitate engagement the bottom of the pan is incised to form two sections 16 and 17 upstanding from the plane of the bottom 13, with an intermediate section 18 depressed slightly downwardly. This forms a slot into which the end 14$^b$ of a leg can be extended.

Fig. 3 shows the leg partly expanded. By employing a spring material for the legs, and shaping them with the ends too far apart to engage the slots in the pans without compressing them, I am able to obtain a tight connection between the pans and legs and a consequent sturdy construction. After the legs are in place, their continued tendency to expand keeps them in place.

The legs are positioned so that their feet may rest on the bottom of the next lower pan. This permits the forming of tiers in the manner shown.

The manner in which the sprouter is employed is as follows: After the parts are manufactured the pans are nested for storage or shipping. The legs may be placed in the uppermost pan, as shown in Fig. 2, or may be handled separately as desired. When shipping, the arrangement illustrated is preferable.

When the sprouter, including any desirable number of sprouter pans, with a single drip pan, is received, the drip pan is placed in any desirable location, where the temperature will be warm enough to sprout the grain. The legs are applied to one sprouter pan, and the assembled pan is then placed over the drip pan. The bottom is then covered with oats, and a sufficient amount of warm water poured thereon. The operation is then repeated until a sufficiently high tier of pans results.

Water is added to the pans from time to time until the oats have sprouted to form a thick matted mass, whereupon it may be broken up for poultry food.

What I claim as new and desire to secure by United States Letters Patent is:

1. An oat sprouter comprising a drip pan and a number of sprouter pans adapted to be placed one above the other to form tiers, each sprouter pan having a plurality of readily removable legs adapted to extend into the next lower pan for a support, or to be removed so that all of the pans can be nested.

2. An oat sprouter comprising a drip pan and a number of sprouter pans, the sprouter pans having legs slidably secured thereto, the sprouter adapted to be set up in a number of tiers with the drip pan lowermost and supporting therein the legs of the next higher sprouter pan in the tier, the legs being removable by simply withdrawing the same and the pans being nestable when the legs are so removed.

3. The oat sprouter defined in claim 2 wherein said legs consist of articulated sections of heavy gauge wire with the two ends formed at right angles to the major portion of the legs, transverse slots in the corner of the pans serving to receive said ends in slidable relation to support the legs.

4. An oat sprouter comprising a number of pans adapted to be placed one above the other to form tiers, the lowermost pan unperforated, while the upper pans adapted to hold the oats have perforated bottoms, the pans having readily removable individual legs and being nestable for shipping.

5. An oat sprouter comprising a pan with outflaring sides and perforated bottom, with readily removable individual legs, the legs being adapted to set within a lower pan, so as to form a tier of pans.

6. An oat sprouter comprising a drip pan, a plurality of sprouter pans, and removable legs secured to the sprouter pans, the drip pan being shallow, with outflaring sides and imperforate bottom, the sprouter pans being of like shape with perforated bottoms and side slots formed from the metal of the bottom, and the legs comprising looped sections of wire with the ends turned at right angles to the main body of the legs and adapted to slide into the bottom slots of the sprouter pans for attachment thereto, the pans all being nestable, and adapted to be assembled to any desired height, the feet of one pan extending into and resting on the the bottom of the next lower pan.

In witness whereof, I hereunto subscribe my name this 22nd day of February, 1927.

JOSEPH WASTAK.